US00RE49756E

(19) United States
(12) Reissued Patent
Kang et al.

(10) Patent Number: US RE49,756 E
(45) Date of Reissued Patent: Dec. 12, 2023

(54) DISPLAY DEVICE UNIT

(71) Applicant: Samsung Display Co. Ltd., Yongin-si (KR)

(72) Inventors: Ha-Yun Kang, Asan-si (KR); Joon Hak Oh, Seongnam-si (KR); Jong Seo Lee, Yongin-si (KR)

(73) Assignee: SAMSUNG DISPLAY CO., LTD., Gyeonggi-Do (KR)

(21) Appl. No.: 16/437,985

(22) Filed: Jun. 11, 2019

Related U.S. Patent Documents

Reissue of:
(64) Patent No.: 9,436,320
Issued: Sep. 6, 2016
Appl. No.: 13/969,993
Filed: Aug. 19, 2013

U.S. Applications:
(62) Division of application No. 16/025,880, filed on Jul. 2, 2018, now Pat. No. Re. 47,802, which is an application for the reissue of Pat. No. 9,436,320.

(30) Foreign Application Priority Data

Dec. 12, 2012 (KR) ..... 10-2012-0144601

(51) Int. Cl.
*G06F 3/041* (2006.01)
*G06F 3/043* (2006.01)
*G06F 3/01* (2006.01)
*H04R 17/00* (2006.01)

(52) U.S. Cl.
CPC ..... *G06F 3/043* (2013.01); *G06F 3/016* (2013.01); *H04R 17/005* (2013.01); *H04R 2400/00* (2013.01); *H04R 2499/11* (2013.01); *H04R 2499/15* (2013.01)

(58) Field of Classification Search
CPC ..... G06F 3/043; G06F 3/016; H04R 17/005; H04R 2499/15; H04R 2499/11; H04R 2499/00
See application file for complete search history.

(56) References Cited

U.S. PATENT DOCUMENTS 5,796,854 A 8/1998 Markow
7,382,890 B2 6/2008 Saiki et al.
7,545,459 B2 6/2009 Fujiwara et al.
(Continued)

FOREIGN PATENT DOCUMENTS

CN 1201181 12/1998
CN 1678945 10/2005
(Continued)

OTHER PUBLICATIONS

Chinese Office Action—Chinese Patent Application No. 201811256229.6 dated Jan. 18, 2022.

*Primary Examiner* — Colin M LaRose
(74) *Attorney, Agent, or Firm* — CANTOR COLBURN LLP

(57) ABSTRACT

A display device unit includes: a display device; and a sound element disposed at a side surface or a rear surface of the display device, where the sound element includes a vibration material layer which provides a sound based on an electric field applied therein, and a pair of electrodes which generates the electric field in the vibration material layer.

20 Claims, 16 Drawing Sheets

(56) References Cited

U.S. PATENT DOCUMENTS

| | | | | |
|---|---|---|---|---|
| 7,583,811 | B2 * | 9/2009 | Wada | H04R 1/025 381/190 |
| 7,657,042 | B2 | 2/2010 | Miyata | |
| 7,826,134 | B2 | 11/2010 | Choi | |
| 8,174,511 | B2 * | 5/2012 | Takenaka | G06F 3/016 345/177 |
| 8,439,514 | B2 | 5/2013 | Cho | |
| 9,389,688 | B2 | 7/2016 | Tossavainen et al. | |
| 2006/0039575 | A1 * | 2/2006 | Wada | H04R 1/025 381/152 |
| 2006/0227981 | A1 | 10/2006 | Miyata | |
| 2006/0256999 | A1 * | 11/2006 | Lin et al. | 381/431 |
| 2007/0019134 | A1 * | 1/2007 | Park et al. | 349/96 |
| 2007/0071259 | A1 * | 3/2007 | Tojo | 381/152 |
| 2007/0097073 | A1 * | 5/2007 | Takashima et al. | 345/156 |
| 2007/0223744 | A1 * | 9/2007 | Wada | H04R 23/008 381/152 |
| 2007/0247019 | A1 | 10/2007 | Takasaki | |
| 2010/0061040 | A1 | 3/2010 | Dabov et al. | |
| 2010/0225600 | A1 * | 9/2010 | Dai | G06F 3/0412 345/173 |
| 2011/0299006 | A1 | 12/2011 | Cheng et al. | |
| 2012/0057730 | A1 * | 3/2012 | Fujise et al. | 381/190 |
| 2012/0243719 | A1 * | 9/2012 | Franklin et al. | 381/333 |
| 2013/0328820 | A1 * | 12/2013 | Kondoh et al. | 345/173 |

FOREIGN PATENT DOCUMENTS

| | | | |
|---|---|---|---|
| CN | 1924650 | | 3/2007 |
| CN | 101273660 | | 9/2008 |
| CN | 102349035 | | 2/2012 |
| EP | 1542064 | | 6/2005 |
| JP | 2002232992 | A | 8/2002 |
| JP | 2002359890 | A | 12/2002 |
| JP | 2006054337 | A | 2/2006 |
| JP | 2007072018 | A | 3/2007 |
| JP | 2007189604 | A | 7/2007 |
| JP | 2008079179 | A | 4/2008 |
| JP | 2008193486 | A | 8/2008 |
| JP | 2008283350 | A | 11/2008 |
| JP | 2009159104 | A | 7/2009 |
| JP | 2010093769 | A | 4/2010 |
| KR | 1020010069463 | A | 7/2001 |
| KR | 1020050014748 | A | 2/2005 |
| KR | 100612217 | A | 5/2005 |
| KR | 10-0612217 | B1 | 8/2006 |
| KR | 100654829 | B1 | 11/2006 |
| KR | 100677408 | B1 | 1/2007 |
| KR | 1020070010577 | A1 | 1/2007 |
| KR | 1020080012569 | A | 2/2008 |
| KR | 1020080037739 | A | 4/2008 |
| KR | 100887337 | B1 | 2/2009 |
| KR | 101047480 | B1 | 7/2011 |
| KR | 1020110128968 | A | 12/2011 |
| KR | 1020110137680 | A | 12/2011 |
| KR | 1020120005751 | A | 1/2012 |
| KR | 1020120081791 | A | 7/2012 |
| KR | 101293558 | B1 | 7/2013 |
| WO | 2012114761 | | 8/2012 |
| WO | WO 2012114761 | A1 * | 8/2012 |

* cited by examiner

DISPLAY DEVICE UNIT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a divisional application of reissue application Ser. No. 16/025,880, filed on Jul. 2, 2018. More than one reissue application has been filed for reissue of U.S. Pat. No. 9,436,320. The more than one reissue application is the present application and application Ser. No. 16/025,880, which was filed on Jul. 2, 2018, and issued as U.S. Pat. No. RE47,802 on Jan. 7, 2020.* This application claims priority to Korean Patent Application No. 10-2012-0144601, filed on Dec. 12, 2012 in the Korean Intellectual Property Office, and all the benefits accruing therefrom under 35 U.S.C. §119, the content of which in its entirety is herein incorporated by reference.

BACKGROUND (a) Field

Exemplary embodiments of the invention relate to a display device unit that displays an image and generates a sound or a vibration.

(b) Description of the Related Art

A display device is developed from a cathode ray tube ("CRT") method using a cathode ray tube, such that various types of flat panel display, such as a liquid crystal display ("LCD"), a plasma display panel ("PDP"), an organic light emitting diode ("OLED") display, an electrowetting display ("EWD"), an electrophoretic display ("EPD"), an embedded microcavity display ("EMD"), and a nanocrystal display ("NCD"), have been developed.

The LCD is one of the most widely used types of the flat panel displays due to reduced size and weight, as well as low power consumption thereof. In a conventional LCD, a liquid crystal material is provided between an upper substrate, on which a common electrode, a color filter or the like, are provided, and a lower substrate, on which a thin film transistor, a pixel electrodes or the like, are provided, an electric field is generated in the liquid crystal material by applying different potentials to the pixel electrode and the common electrode to thereby change an arrangement of liquid crystal molecules, and transmittance of light is thereby adjusted through the change of the arrangement of the liquid crystal molecules to display an image.

An LCD panel in the LCD is a light receiving element which does not emit light by itself, such that the LCD includes a backlight unit for proving light to the LCD panel under the LCD panel.

Among the various types of the flat panel display, the OLED includes a light emitting diode ("LED") as a self-emitting light source, such that a backlight is not provided therein.

However, in such a display device, a speaker is typically separately installed to provide sound. When the display device is provided as a touch sensing display device, a panel including a touch sensor is added to sense a touch thereon, or the touch sensor may be provided in the display device.

SUMMARY

Exemplary embodiments of the invention relate to a display device unit that generates a sound without a separately provided speaker and senses a touch thereon without a separately provided touch panel or touch sensor.

An exemplary embodiment of a display device unit according to the invention includes: a display device; and a sound element disposed at a side surface or a rear surface of the display device, where the sound element includes a vibration material layer which provides a sound based on an electric field applied therein, and a pair of electrodes which generates the electric field in the vibration material layer.

In an exemplary embodiment, the display device unit may further include a vibration plate disposed between the display device and the sound element.

In an exemplary embodiment, the display device unit may further include a window disposed on a front surface of the display device.

In an exemplary embodiment, the display device unit may further include a back chassis disposed at a rear surface of the display device, and opposite to the window.

In an exemplary embodiment, the back chassis may include a fixing protrusion which protrudes toward the rear surface of the display device and contacts the sound element.

In an exemplary embodiment, the display device unit may further include a first spacer disposed between the sound element and the vibration plate.

In an exemplary embodiment, the display device unit may further include a second spacer disposed between the sound element and the back chassis.

In an exemplary embodiment, the sound element may be provided as a pair.

In an exemplary embodiment, the back chassis may include a fixing protrusion which protrudes away from the rear surface of the of the display device.

In an exemplary embodiment, the display device unit may further include a back chassis disposed between the display device and the sound element.

In an exemplary embodiment, the vibration material layer of the sound element may have a film shape.

In an exemplary embodiment, the display device unit may further include a receiver disposed at the side surface of the display device and an inner surface of the window, where the receiver include the sound element and transmits the sound.

In an exemplary embodiment, an opening may be defined in the window and expose the receiver.

In an exemplary embodiment, the display device unit may further include disposed between the sound element, where the spacer defines a vibration space where the sound element vibrates.

In an exemplary embodiment, the vibration material layer of the sound element may generate a vibration of a frequency outside an audible frequency, and a haptic function of the display device unit uses a change of the frequency of the vibration of the vibration material layer by a touch of a user.

In an exemplary embodiment, where the display device is a non-emissive display device including a backlight, a material that generates a sound by an electric field applied therein, such as polyvinylidene fluoride ("PVDF") or lead zirconate titanate ceramic ("PZT") is provided on a rear surface of the display device, e.g., an optical sheet such as the reflection sheet or the diffuser sheet of the backlight, such that the display device unit may generate a sound without a speaker. In an alternative exemplary embodiment, where the display device is a self-emissive display device or the non-emissive display device unit without the backlight, the sound element including the material that generates the sound is provided at a rear surface of the display panel such that the sound may be provided without the speaker. In another alternative exemplary embodiment, a touch of a user may be sensed based on a change of the frequency of the vibration of the vibration material layer by the touch such that an additional touch screen may be omitted. In an exemplary embodiment, the display device unit may further include a receiver including the material that generates the sound without providing an opening that exposes the receiver on the window.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
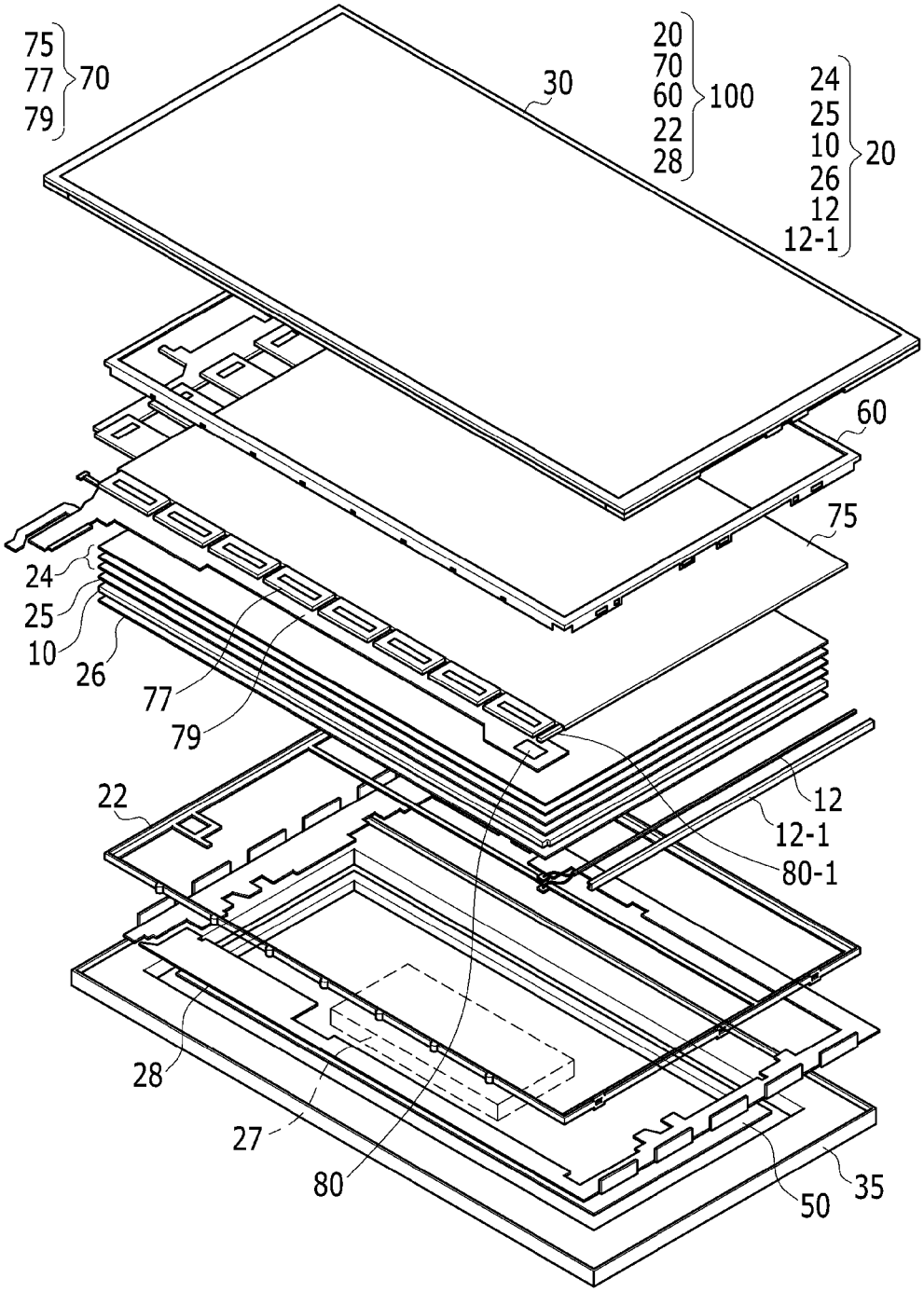
FIG. 1 is an exploded perspective view of an exemplary embodiment of a display device unit according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice.

Hereinafter, exemplary embodiments of a liquid crystal display according to the invention will be described in detail with reference to the accompanying drawings.

Now, an exemplary embodiment of a display device unit according to the invention will be described with reference to FIG. 1 and FIG. 2.

Figure 2:
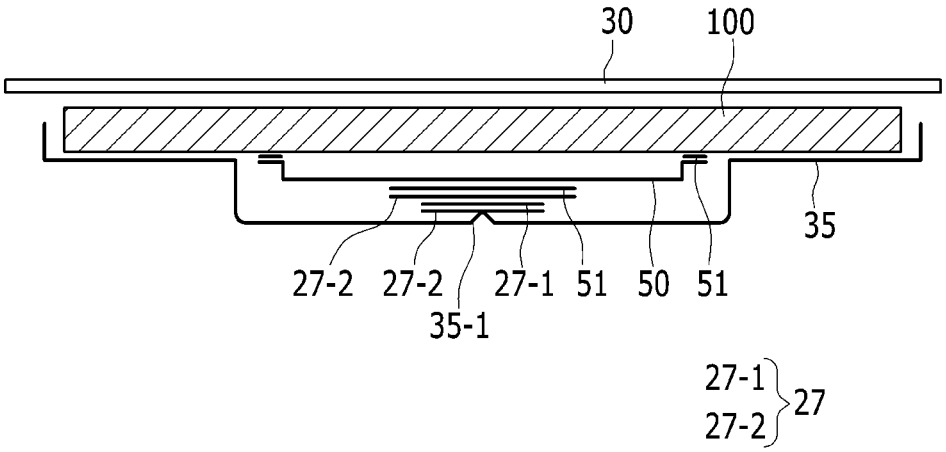
FIG. 2 is a cross-sectional view of the display device unit of FIG. 1.

FIG. 1 is an exploded perspective view of an exemplary embodiment of a display device unit according to the invention, and FIG. 2 is a cross-sectional view of the display device unit of FIG. 1.

An exemplary embodiment of the display device unit, as shown in FIG. 1, includes a window 30, a back chassis 35, a sound element 27 and a display device 100. In an exemplary embodiment, the display device 100 is a non-emissive type of display device, and includes a light source 12, as shown in FIG. 1, but the invention is not limited thereto. Hereinafter, for convenience of description, an exemplary embodiment where the display device 100 is a liquid crystal display will be described, and the display device will be referred to as a liquid crystal display 100.

Hereinafter, the liquid crystal display 100 will be described.

In an exemplary embodiment, the liquid crystal display 100 includes a backlight unit 20 that provides light and a liquid crystal panel assembly 70 that displays an image by receiving the light from the backlight unit 20. In such an embodiment, the liquid crystal display 100 further includes a top chassis 60, a mold frame 22 and bottom chassis 28 that fixes and supports the top chassis 60 and the mold frame 22.

In such an embodiment, the backlight unit 20 provides the light to the liquid crystal panel assembly 70, and the liquid crystal panel assembly 70 disposed on the backlight unit 20 controls transmission of the light supplied by the backlight unit 20 to express a grayscale, thereby displaying the image.

In such an embodiment, the liquid crystal panel assembly 70 includes a liquid crystal panel 75, an integrated circuit ("IC") chip 77 and a flexible printed circuit board ("FPC") 79.

The liquid crystal panel 75 includes a thin film transistor ("TFT") substrate having a plurality of TFTs, an upper substrate disposed on the TFT substrate, and a liquid crystal layer interposed between the TFT substrate and the upper substrate. The IC chip 77 is disposed, e.g., mounted, on the TFT substrate thereby controlling the liquid crystal panel 75.

The TFT substrate may include a transparent insulation substrate including thin film transistors, which are arranged substantially in a matrix form, and each thin film transistor includes a source terminal connected to a data line, a gate terminal connected to a gate line, and a drain terminal connected to a pixel electrode including a transparent conductive material, e.g., indium tin oxide ("ITO").

In an exemplary embodiment, the data line and the gate line of the liquid crystal panel 75 are connected to the flexible printed circuit board 79. In such an embodiment, when an electrical signal is input from the flexible printed circuit board 79, the electrical signal is transmitted to the source terminal and the gate terminal of TFT, and the TFT is turned on or turned off based on a scanning signal applied to the gate terminal through the gate line, such that the transmission of an image signal to the source terminal through the data line is controlled. The flexible printed circuit board 79 receives the image signal from an outside of the liquid crystal panel 75, e.g., from an external device, applies driving signals to the data line and the gate line of the liquid crystal panel 75 based on the image signal.

In an exemplary embodiment, an upper substrate is disposed opposite to, e.g., facing on the TFT substrate. The upper substrate may be a substrate including red, green and blue (RGB) color filters for displaying predetermined colors when the light passes therethrough and a common electrode including a transparent conductive material, e.g., ITO, is deposited on the color filters. In an exemplary embodiment, the upper substrate may be provided by a thin film process. When the thin film transistor is turned on by applying voltages to the gate terminal and the source terminal of the TFT, an electric field is generated between the pixel electrode and the common electrode of the upper substrate. When the electric field is generated between the pixel electrode and the common electrode of the upper substrate, an arrangement angle of liquid crystal between the TFT substrate and the upper substrate is changed and light transmittance is changed according to the changed arrangement angle, thereby displaying an image.

The flexible printed circuit board 79 generates the image signal and the scanning signal, which drives the liquid crystal display 100, and a plurality of timing signals, which controls the timing of application of the image and scanning signals, and the flexible printed circuit board 79 applies the image signal and the scanning signal to the gate line and the data line of the liquid crystal panel 75, respectively. In an exemplary embodiment, an amp 80 that amplifies and transmits a sound signal is disposed in the flexible printed circuit board 79. The amp 80 receives and amplifies the sound signal transmitted from outside to transmit the sound signal to a diffuser sheet 25 of the backlight unit 20 through a sound signal wire 80-1. In an exemplary embodiment, the sound signal wire 80-1 may be a wire disposed on a flexible substrate that includes the same material as the flexible printed circuit board 79. In an alternative exemplary embodiment, the sound signal wire 80-1 may be provided by additional wiring.

The structure of an exemplary embodiment of the liquid crystal panel 75 is described above, but the invention is not limited thereto. In one alternative exemplary embodiment, for example, the common electrode or the color filter may be disposed in the TFT substrate. In another alternative exemplary embodiment, an additional printed circuit board ("PCB") may be further included, and the PCB and the TFT substrate may be connected by the flexible printed circuit board. In an alternative exemplary embodiment, the amp 80 may be disposed on the PCB connected to the flexible printed circuit board 79.

An exemplary embodiment, where the display device is a liquid crystal panel, is described above, but the invention is not limited thereto. In alternative exemplary embodiments, the display device may be one of various types of non-emissive type of display panel.

In an exemplary embodiment, the backlight unit 20 that provides light substantially uniformly to the liquid crystal panel 75 is disposed under the liquid crystal panel assembly 70, and the backlight unit 20 is received on the bottom chassis 28.

In an exemplary embodiment, as shown in FIG. 1, the back light unit 20 includes a light source 12, a substrate 12-1, a light guide 10, a reflection sheet 26, a diffuser sheet 25 and an optical sheet 24. In such an embodiment, the light source 12 is fixed to the mold frame 22 and supplies the light to the liquid crystal panel assembly 70, the substrate 12-1 supplies power to the light source 12, the light guide 10 guides the light emitted from the light source 12 and supplies the light to the liquid crystal panel assembly 70, the reflection sheet 26 is disposed overlapping substantially an entire lower surface of the light guide 10 and reflects the light, and the diffuser sheet 25 and the optical sheet 24 provide a luminance characteristic of the light from the light source 12. The optical sheet 24 may include at least one of various optical sheets such as a film that improves the luminance or a prism sheet having a prism structure. In an exemplary embodiment, as shown in FIG. 1, the light source 12 may include a fluorescent lamp such as a cold-cathode fluorescent lamp ("CCFL"), but the invention is not limited thereto. In an alternative exemplary embodiment, the light source 12 may include a light emitting diode ("LED").

The top chassis 60 that effectively prevents the liquid crystal display panel assembly 70 from being separated from the bottom chassis 28 while bending the flexible printed circuit board 79 to the outside of the mold frame 22 is disposed on the liquid crystal display panel assembly 70.

In an exemplary embodiment, a window 30 including tempered glass or plastic is disposed at the front surface of the liquid crystal display 100 such that the liquid crystal display 100 is effectively prevented from being damaged by an external impact. The window 30 is disposed at the front surface of the display panel assembly 70. In an exemplary embodiment, the window 30 may define an outer surface of a display side of a portable electronic device such as a portable phone or other electronic devices.

The back chassis 35 corresponding to the window 30 is disposed at the rear surface of the liquid crystal display 100. The back chassis 35 may be attached to the window 30, thereby enclosing the liquid crystal display 100.

In an exemplary embodiment, the sound element 27 is disposed between the back chassis 35 and the liquid crystal display 100. Referring to FIG. 2, the sound element includes a vibration material layer 27-1 and an electrode, e.g., a pair of electrodes 27-2.

The vibration material layer 27-1 is vibrated by receiving the electric field, thereby provide a sound. In an exemplary embodiment, the vibration material layer 27-1 may include a piezoelectric material, for example, a vibration material such as polyvinylidene fluoride ("PVDF") or lead zirconate titanate ceramic ("PZT).

Figure 14:
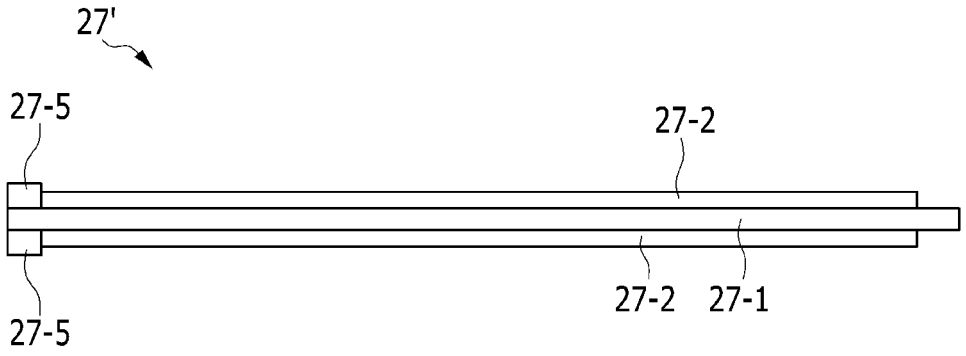
FIG. 14 is a cross-sectional view of an exemplary embodiment of a sound element of the display device unit of FIG. 13.

The PVDF includes polyvinylidene fluoride trifluoroethylene ("PVDF-TrFE"), and may be efficiently provided in a flexible film shape due to the material characteristic thereof. In an exemplary embodiment, as shown in FIG. 14, the vibration material layer 27-1 may include PVDF, and the vibration material layer 27-1 may be efficiently provided in a wide region.

The PZT may not be efficiently provided in the film shape when compared to the PVDF. In an exemplary embodiment, is the vibration material layer 27-1 may include PZT, and the vibration material layer 27-1 may be efficiently provided in a partial region, as shown in FIG. 2.

In an alternative exemplary embodiment, PZT and PVDF (or PVDF-TrFE) may be mixed and provided in the film shape.

The pair of electrodes 27-2 are positioned at both side surfaces of the vibration material layer 27-1, respectively, and provide the electric field to the vibration material layer 27-1. Each electrode 27-2 may include a conductive material such as a transparent conductor of ITO or indium zinc oxide ("IZO"), a conductive polymer, or carbon nanotubes ("CNT").

In an exemplary embodiment, as shown in FIG. 2, a vibration plate 50 may be disposed between the sound element 27 and the liquid crystal display 100. In such an embodiment, the vibration plate 50 may be attached to the rear surface of the liquid crystal display 100, that is, the rear surface of the reflection sheet 26 of the backlight unit 20 or the rear surface of the bottom chassis 28 by an adhesive 51, and the sound element 27 may be attached on the vibration plate 50 by the adhesive 51. The vibration plate 50 has a bent structure, thereby defining a vibration space, which may allow the sound provided by the sound element 27 to vibrate, and may reduce the vibration of the liquid crystal display 100 due to the vibration of the sound.

In an exemplary embodiment, a fixing protrusion 35-1 is disposed at the center portion of the back chassis 35. The fixing protrusion 35-1 is protruding toward the rear surface of the liquid crystal display 100, and the fixing protrusion 35-1 may contact the sound element 27. In such an embodiment, the fixing protrusion 35-1 may effectively prevent the sound element from being displaced by the vibration of the sound.

In an exemplary embodiment, the sound element 27 receives the sound signal. In an exemplary embodiment, as shown in FIG. 1, the flexible printed circuit board 79 includes the amp 80 that amplified the received sound signal.

In an exemplary embodiment, the flexible printed circuit board 79 includes the amp 80 that amplifies and transmits the sound signal. The amp 80 receives and amplifies the sound signal transmitted from outside, and transmits the amplified sound signal to the pair of electrodes 27-2 in the sound element 27 at the rear surface of the liquid crystal display 100 through the sound signal wire 80-1, thereby vibrating the vibration material layer 27-1. In such an embodiment, as described above, the sound signal wire 80-1 may be provided as a wiring disposed on a flexible substrate including the same material as the flexible printed circuit board 79, or may be provided by additional wiring.

In an alternative exemplary embodiment, the vibration plate 50 may be omitted, and the sound element 27 may be directly attached to the rear surface of the liquid crystal display 100 or the rear surface of the bottom chassis 28.

Next, sound generation by the vibration material layer 27-1 will be described with reference to FIG. 3 and FIG. 4.

Figure 3:
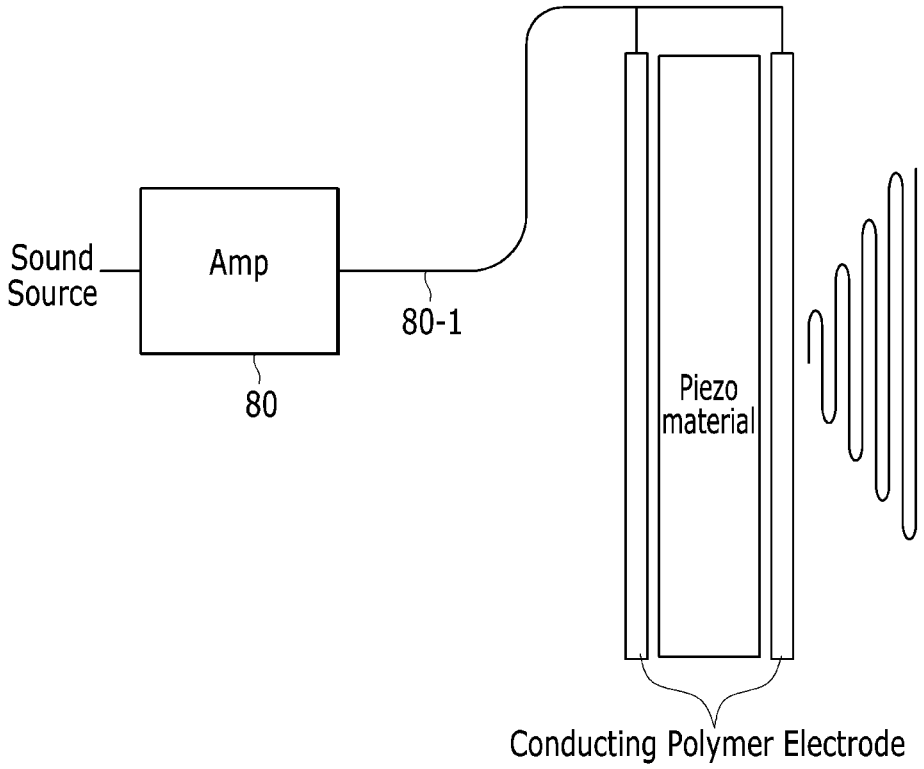
FIG. 3 and FIG. 4 are block diagrams showing an operation characteristic of a vibration material in an exemplary embodiment of the display device unit according to the invention.
Figure 4:
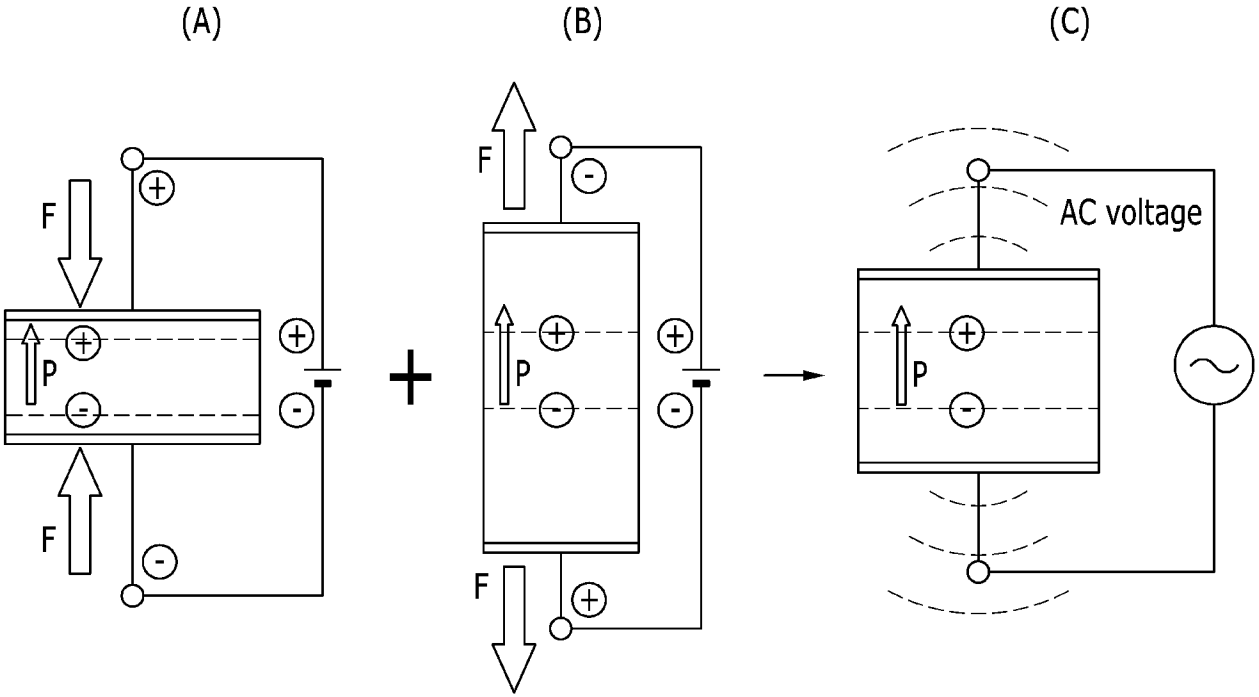

FIG. 3 and FIG. 4 are block diagrams showing an operation characteristic of an exemplary embodiment of a vibration material according to the invention.

In FIG. 3, the piezoelectric material (e.g., PVDF or PZT) is used as the vibration material layer, and the conductive polymer electrodes are provided as the pair of electrodes. The polymer electrodes are applied with the sound signal, which is provided from a sound source and amplified by the amp 80, through the sound signal wire 80-1.

In such an embodiment, when the sound signal is applied, a sound wave is generated by the vibration of the vibration material as shown in FIG. 4.

In (A) and (B) of FIG. 4, a direction of a force F applied to the vibration material layer when a voltage is applied to the vibration material layer is shown. The direction of the force F is changes according to the direction of the voltage, such that when alternating current (AC) voltage is applied as shown in (C) of FIG. 4, the vibration material layer is vibrated and a sound is generated by the vibration.

Next, exemplary embodiments of the sound element 27 will be described with reference to FIG. 5 and FIG. 6.

Figure 5:
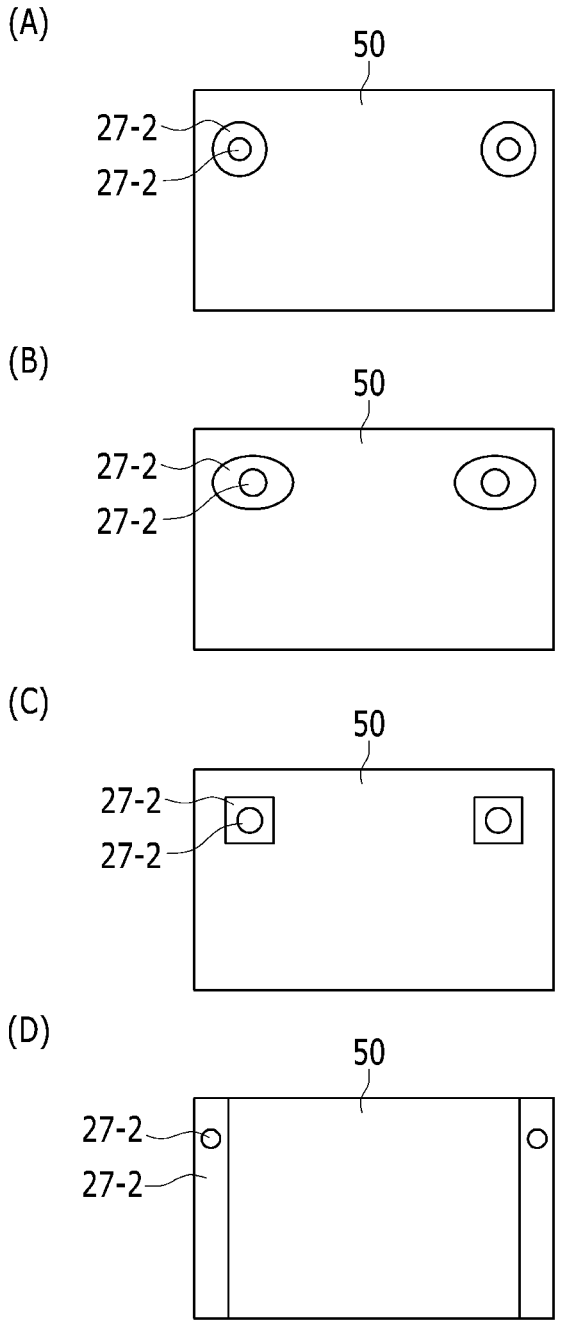
FIG. 5 is a block diagram showing exemplary embodiments of a sound element in a display device unit according to the invention.
Figure 6:
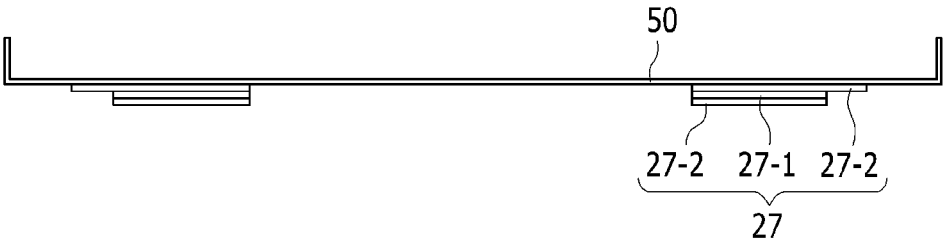
FIG. 6 is a cross-sectional view of an exemplary embodiment of the sound element of FIG. 5.

FIG. 5 is a block diagram showing exemplary embodiments of a sound element in a display device unit according to the invention, and FIG. 6 is a cross-sectional view of an exemplary embodiment of a sound element in a display device of FIG. 5.

In the exemplary embodiments of FIG. 5 and FIG. 6, two sound elements 27 are provided, and FIG. 5 shows various exemplary embodiments of the two sound elements disposed at the rear surface of the display device 100.

In an exemplary embodiment, as show in (A) of FIG. 5, the pair of electrodes 27-2 have a circular structure, a first electrode (referred to as an adhesion electrode) of the pair of electrode 27-2 is attached, e.g., adhered, to the vibration plate 50, and a second electrode (referred to as an opposed electrode) is disposed opposite to the first electrode. In such an embodiment, the first electrode may be larger than the second electrode. The vibration material layer 27-1 may have a size substantially the same as the opposed electrode.

The two sound elements may be disposed substantially symmetrically with respect to an imaginary center line on the vibration plate 50, e.g., at right and left side of the vibration plate 50. In an exemplary embodiment, as shown in FIG. 5, the two sound elements are positioned at the right upper side and the left upper side, respectively, but not being limited thereto. In an alternative exemplary embodiment, the positions of the two sound elements may be different from the positions of the two sound elements shown in FIG. 5.

In an alternative exemplary embodiment, as shown in (B) of FIG. 5, the adhesion electrode 27-2 has an oval structure, and the vibration material layer 27-1 and the opposed electrode 27-2 have a circular structure.

In another alternative exemplary embodiment, as shown in (C) of FIG. 5, the adhesion electrode 27-2 has a quadrangular structure, and the vibration material layer 27-1 and the opposed electrode 27-2 have a circular structure.

In another alternative exemplary embodiment, as shown in (D) of FIG. 5, the adhesion electrode 27-2 has an elongated structure disposed along the right and left edges of the vibration plate 50, and the vibration material layer 27-1 and the opposed electrode 27-2 have a circular structure and are disposed in a partial region of the adhesion electrode 27-2.

In FIG. 5, various exemplary embodiments are shown, but the invention is not limited thereto.

FIG. 6 is a cross-sectional view of an exemplary embodiment shown in FIG. 5, where the two sound elements 27 are disposed on both sides of the vibration plate 50, respectively. In the exemplary embodiment of FIG. 6, an adhesive 51 (shown in FIG. 2) is not provided between the adhesion electrode 27-2 of the sound element 27 and the vibration plate 50. In an alternative exemplary embodiment, the adhesion electrode 27-2 of the sound element 27 and the vibration plate 50 may be attached, e.g., adhered, to each other by the adhesive 51, as shown in FIG. 2.

Next, an alternative exemplary embodiment of the sound element 27 will be described with reference to FIG. 7 and FIG. 8.

Figure 7:
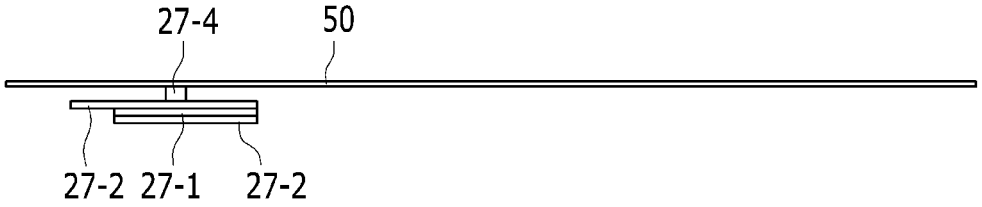
FIG. 7 and FIG. 8 are cross-sectional views of exemplary embodiments of a sound element disposed on a vibration plate according to the invention.
Figure 8:
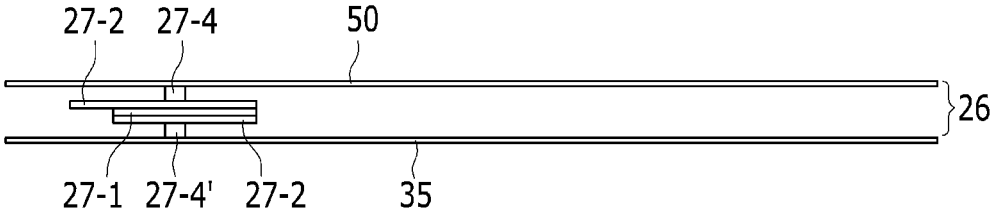

FIG. 7 and FIG. 8 are cross-sectional views of exemplary embodiments of the sound element disposed on the vibration plate according to the invention.

In an exemplary embodiment, as shown in FIG. 7 and FIG. 8, only a portion of the sound element 27 may be attached, e.g., adhered, to the vibration plate 50.

According to an exemplary embodiment, the vibration plate 50 and the sound element 27 may be disposed substantially close to each other. In such an embodiment, when the portion of the sound element 27 is in contact with the vibration plate 50 and the remaining portion thereof is separated with a predetermined interval, a minute vibration may be effectively changed into sound and the vibration space of the sound may be provided by effectively preventing the vibration from being reduced by the vibration plate 50.

Firstly, a structure of the exemplary embodiment shown in FIG. 7 will be described in detail.

In FIG. 7, only the rear surface of the vibration plate 50 is shown, and the back chassis 35 is omitted.

In an exemplary embodiment the sound element 27 includes a pair of electrode 27-2. In such an embodiment, the vibration material layer 27-1 and the pair of electrodes 27-2 are disposed at the rear surface of the vibration plate 50. The vibration plate 50 and the sound element 27 are connected, e.g., attached, to each other via a first spacer 27-4, which is disposed therebetween. In an exemplary embodiment, the first spacer 27-4 may include tape, an adhesive, rubber, an insulating material or a metal, for example, and the first spacer 27-4 may be attached to the sound element 27 and the vibration plate 50.

In an exemplary embodiment, as shown in FIG. 7, the vibration plate 50 has a plate structure, but not being limited thereto. In an alternative exemplary embodiment, the vibration plate 50 may have a bent structure as in the exemplary embodiment shown in FIG. 2 or FIG. 6.

In an exemplary embodiment, the vibration plate 50 may define a vibration space for amplifying the sound based on the bent structure thereof as shown in FIG. 2 or FIG. 6.

In an alternative exemplary embodiment, as shown in FIG. 7, where the sound element 27 is separated from the vibration plate 50 by a predetermined distance, the space provided by the first spacer 27-4 may function as the vibration space. In an alternative exemplary embodiment, the vibration plate 50 may be omitted and the sound element 27 may be attached, e.g., adhered, directly to the rear surface (e.g., the rear surface of the bottom chassis 28 shown in FIG. 1) of the liquid crystal display 100 by the first spacer 27-4.

Next, an exemplary embodiment of FIG. 8 will be described in detail.

In an exemplary embodiment, as shown in FIG. 8, shows the rear surface of the vibration plate 50 and the back chassis 35 of an exemplary embodiment of the display device unit is included.

In an exemplary embodiment, the vibration material layer 27-1 and the pair of electrodes 27-2 are disposed between the vibration plate 50 and the back chassis 35. The vibration plate 50 and the sound element 27 are connected, e.g., attached, to each other via the first spacer 27-4, and the back chassis 35 and the sound element 27 are connected, e.g., attached, to each other via a second spacer 27-4'. The second spacer 27-4' may include the tape, the adhesive, the robber, the insulating material or the metal, thereby connecting the sound element 27 to the vibration plate 50 or the sound element 27 to the back chassis 35.

In an exemplary embodiment, as shown in FIG. 8, the vibration plate 50 or the back chassis 35 has a plate structure, but not being limited thereto. In an alternative exemplary embodiment, the vibration plate 50 may have the bent structure as in the exemplary embodiment of FIG. 2 or FIG. 6.

In an exemplary embodiment, the vibration plate 50 may define the vibration space for amplifying the sound based on the bent structure as shown in FIG. 2 or FIG. 6.

In an exemplary embodiment, as shown in FIG. 8, where the sound element 27 is separated from the vibration plate 50 by a predetermined distance, the space provided by the spacer 27-4 may function as the vibration space such that the vibration plate 50 may have a plane shape. In an exemplary embodiment, as shown in FIG. 8, a spacer 27-4' is disposed between the back chassis 35 and the sound element 27, thereby providing a vibration space between the vibration plate 50 and the back chassis 35. In such an embodiment, the vibration plate 50 may be omitted. In an exemplary embodiment, where the vibration plate 50 is omitted, the sound element 27 may be disposed, e.g., attached or adhered, between the rear surface of the liquid crystal display 100 (e.g., the rear surface of the bottom chassis 28 of FIG. 1) and the back chassis 35.

In an exemplary embodiment, as shown in FIG. 7 and FIG. 8, a single sound element 27 may be provided, but not being limited thereto. In an alternative exemplary embodiment, as shown in FIG. 5 and FIG. 6, a pair of sound element may be provided, or three or more sound elements may be provided.

In an alternative exemplary embodiment, the sound element 27 may be disposed inside the bottom chassis 28.

In the exemplary embodiments described above, the sound element 27 is disposed on, e.g., attached or adhered to, the rear surface of the vibration plate 50. In an alternative exemplary embodiment, the sound element 27 may be directly disposed on, e.g., attached or adhered to, the rear surface of the display device, and the vibration plate 50 may be omitted. In an exemplary embodiment, the sound element 27 may be disposed on, e.g., adhered to, the rear surface of the back chassis 35 or the rear surface of the window 30.

Hereinafter, an exemplary embodiment where the vibration plate 50 is omitted will be described with reference to FIG. 9.

Figure 9:
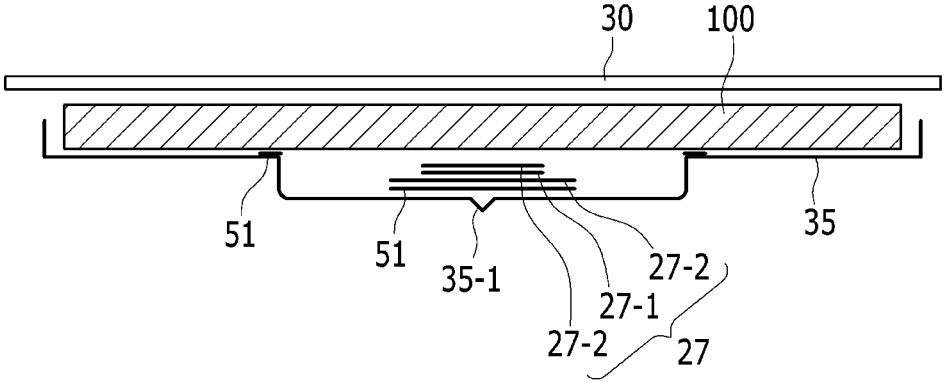
FIG. 9 is a cross-sectional view of an alternative exemplary embodiment of a display device unit according to the invention.

FIG. 9 is a cross-sectional view of another alternative exemplary embodiment of a display device unit according to the invention.

The display device in FIG. 9 is substantially the same as the display device shown in FIG. 2 except for the vibration plate 50. The same or like elements shown in FIG. 9 have been labeled with the same reference characters as used above to describe the exemplary embodiments of the display device unit shown in FIG. 2, and any repetitive detailed description thereof will hereinafter be omitted or simplified.

Referring to FIG. 9, the sound element 27 is disposed inside the back chassis 35, e.g., attached to an inner surface of the back chassis 35 by the adhesive 51. In an exemplary embodiment, as shown in FIG. 9, the vibration plate 50 is omitted, and the back chassis 35 may function as a vibration plate. In such an embodiment, the back chassis 35 defines the vibration space for vibrating the sound provided by the sound element, and may perform the function of smoothing the direct vibration of the display device 100 by the vibration of the sound element 27. In an exemplary embodiment, as shown in FIG. 9, the back chassis 35 is adhered at the rear surface of the display device 100 by the adhesive 51. In such an embodiment, the back chassis 35 has the function of the vibration plate, and the back chassis 35 may define the size of the vibration space. In an alternative exemplary embodiment, the back chassis 35 may be spaced apart from the rear surface of the display device 100.

In an exemplary embodiment, as shown in FIG. 9, the fixing protrusion 35-1 is positioned at the center portion of the back chassis 35, and the fixing protrusion 35-1 is protruding toward the outside of a device including the display device unit (e.g., an electronic device including the display device unit such as a mobile phone or a laptop). In such an embodiment, the fixing protrusion 35-1 of the back chassis 35 may adhere to a main body of the device including the display device unit when the display device unit (including the window and the back chassis) is inserted to the main body, such that the fixing protrusion 35-1 effectively prevents the sound element from being separated from the determined position on the main body by the vibration.

In an exemplary embodiment, where the display device 100 is the liquid crystal display 100, the liquid crystal display 100 includes the backlight unit 20 as shown in FIG. 1. In an alternative exemplary embodiment, where the display device 100 is a self-emissive type of display device, the backlight unit 20 may not be included.

Next, a touch sensing function using the vibration of a frequency outside an audible frequency among the vibration generated by the sound element 27 will be described with reference to FIG. 10.

Figure 10:
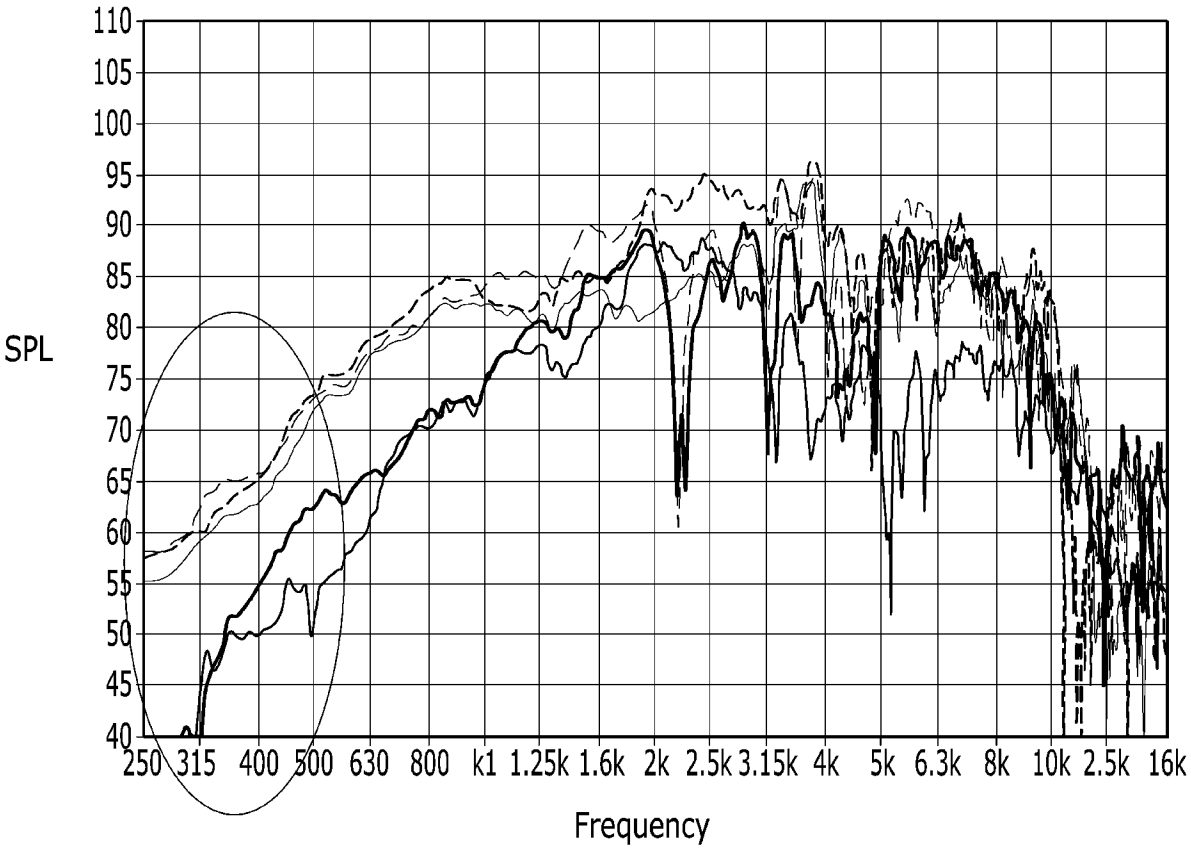
FIG. 10 is a graph showing a sound characteristic of an exemplary embodiment of a display device according to the invention.

FIG. 10 is a graph of a sound characteristic of an exemplary embodiment of a display device according to the invention.

In FIG. 10, a graph showing a sound pressure level ("SPL") according to a frequency of an exemplary embodiment of the display device including the sound element is shown.

As shown in FIG. 10, vibration of a frequency outside of the audible frequency as well as the sound of the audible frequency range is generated by the vibration in an exemplary embodiment of the display device (e.g., a circled portion of FIG. 10).

The vibration of a frequency outside the audible frequency is not provided to a user as an actual sound. In an exemplary embodiment, a touch on a screen may be sensed using the vibration in a frequency outside of the audible frequency such that a touch function may be provided by the sound element without additionally provided touch sensor or touch panel.

In an exemplary embodiment, the vibration is generated in the display device by the sound element, and the user may sense the vibration of a frequency outside of the audible frequency by touching the display device, and the display device may sense a touch thereon based on a change of the vibration by the touch. The touch sensing by the sound element may be used to sense whether a touch exists or not on the display panel. In an exemplary embodiment, the touch sensing by the sound element may be used together with a haptic function. In such an embodiment, the vibration material layer may generate vibration of a frequency outside the audible frequency, and senses the change of the frequency of the vibration such that the touch of the user is sensed based on the change of the frequency of the vibration, thereby realizing the haptic function. In an exemplary embodiment, an additional sensor for sensing the change of the vibration may be separately provided.

Referring to the graph shown in FIG. 10, the quality of the sound generated in the sound element 27 may be limited. In an exemplary embodiment, a sound of predetermined quality is effectively provided without providing an additional speaker in the display device. In one exemplary embodiment, for example, the sound of the predetermined quality may include sound of human voice, sound from a receiver, music or guitar sound.

Next, an exemplary embodiment including the receiver will be described with reference to FIG. 11 and FIG. 12.

Figure 11:
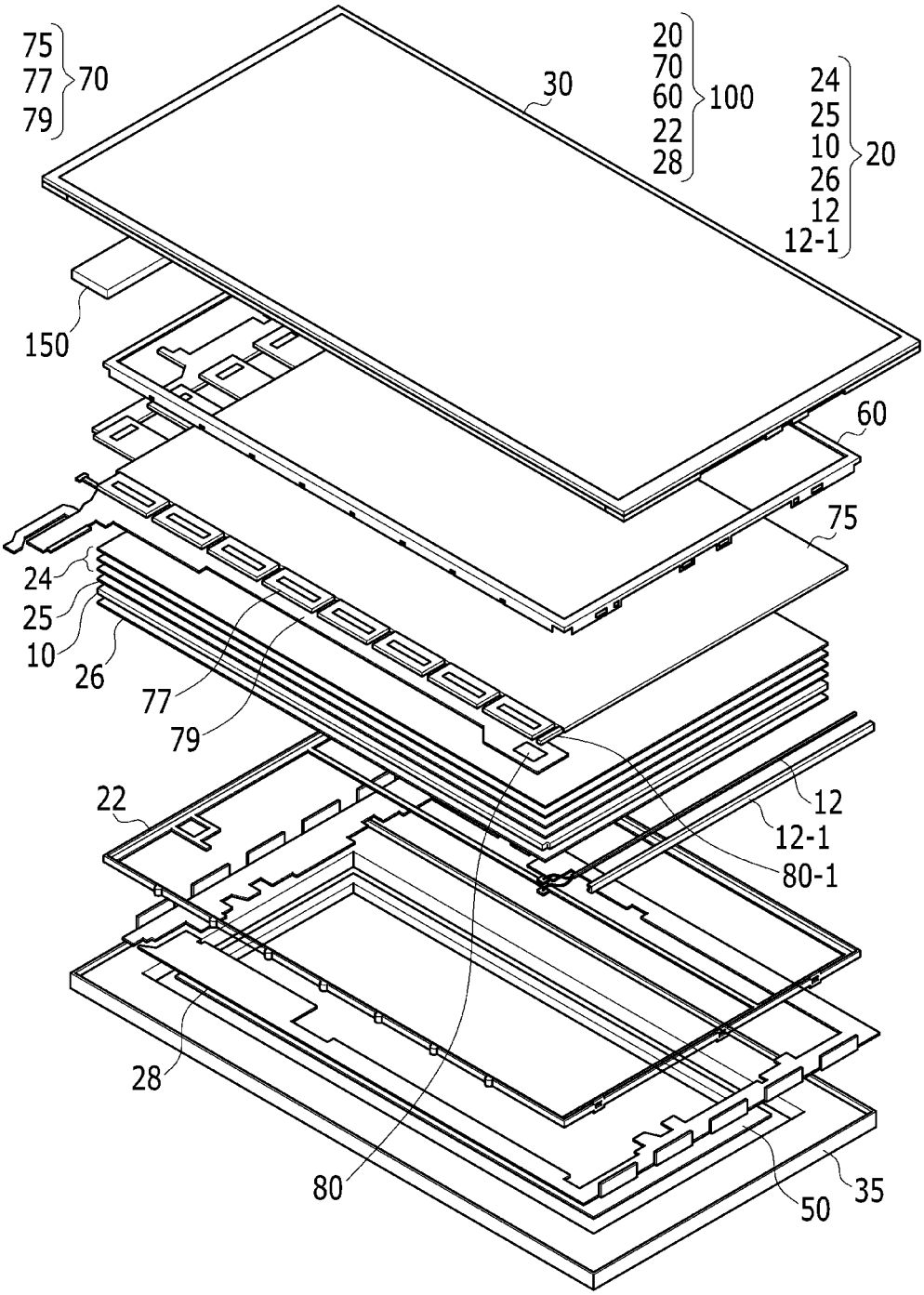
FIG. 11 is an exploded perspective view of an alternative exemplary embodiment of a display device unit including a receiver according to the invention.
Figure 12:
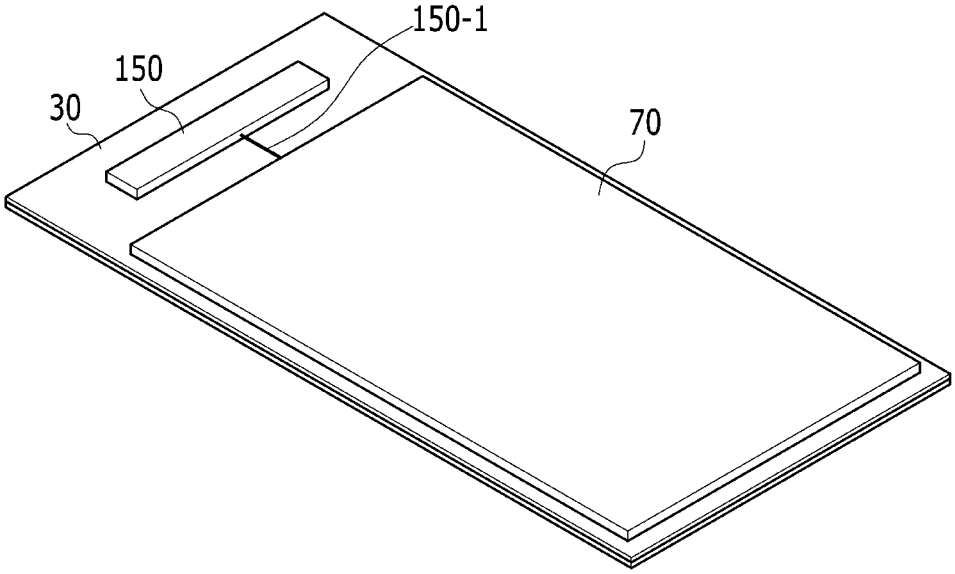
FIG. 12 is a perspective view of an alternative exemplary embodiment of the receiver shown in FIG. 11.

FIG. 11 is an exploded perspective view of an exemplary embodiment of a display device unit including a receiver according to the invention, and FIG. 12 is a perspective view of an alternative exemplary embodiment of a receiver shown in FIG. 11.

The display device unit in FIG. 11 is substantially the same as the display device unit shown in FIG. 1 except for the sound element 27. The same or like elements shown in FIG. 11 have been labeled with the same reference characters as used above to describe the exemplary embodiments of the display device unit shown in FIG. 1, and any repetitive detailed description thereof will hereinafter be omitted or simplified. In an exemplary embodiment, as shown in FIG. 11, the display device unit may further include a receiver 150 including the sound element, and an additional sound element 27 is not provided between the back chassis 35 and the liquid crystal display 100. In an exemplary embodiment, as shown in FIG. 11, the receiver 150 including the sound element is disposed at the side surface of the display device 100 and on the rear surface of the window 30.

The window 30 is disposed at the front surface of the display panel assembly 70, and may define an outer surface of a display side of an electronic device, e.g., a portable electronic device such as a portable phone.

In an exemplary embodiment, where the electronic device is a portable phone, the electronic device may include a portion for transmitting the sound and a portion for receiving the sound (e.g., the receiver 150). In such an embodiment, the receiver 150 that generates a received sound may be disposed at the inside surface of the window 30, and the side surface of the display panel assembly 70, as shown in FIG. 11. In such an embodiment, the receiver 150 may be adhered at the inside surface of the window 30 by the adhesive.

In such an embodiment, the receiver 150 may include the vibration material layer and a pair of electrodes as in the exemplary embodiment of the sound element 27 shown in FIG. 2.

In an exemplary embodiment, as shown in FIG. 11, the flexible printed circuit board 79 includes the amp 80 that amplifies and transmits the sound signal. The amp 80 receives and amplifies the sound signal transmitted from outside, and then transmits the amplified sound signal to the electrodes in the receiver 150 through the sound signal wire 80-1, thereby vibrating the vibration material layer. In an exemplary embodiment, the sound signal wire 80-1 has a structure, in which a wiring is provided on a flexible substrate including the same material as the flexible printed circuit board 79. In an alternative exemplary embodiment, the sound signal wire 80-1 may be provided as a separate wiring. In an exemplary embodiment, the sound signal output from the amp 80 may be transmitted through the sound signal wire 80-1 and wiring 150-1 for the receiver shown in FIG. 12. The receiver wiring 150-1 is connected to the receiver 150 and the display panel assembly 70 outside the display panel assembly 70.

In an exemplary embodiment, as shown in FIG. 11, the window 30 may not include an opening at the position where the receiver 150 is adhered. In such an embodiment, the receiver 150 generates the sound by the vibration generated at the vibration material layer of the sound element such that the sound may be transmitted to the user although the window 30 does not include the opening. In an exemplary embodiment, where the electronic device is the portable phone, the receiver 150 generates the sound by the vibration such that the window 30 may not include an opening for transmitting the sound, and the sound that is spoken by another party may be generated based on the vibration.

In such an embodiment, a process of providing an opening in the window 30 for the receiver 150 may be omitted in a process of manufacturing the window 30 such that the manufacturing process of the display device unit is simplified and manufacturing cost of the display device unit is reduced.

In an exemplary embodiment, as shown in FIG. 11, the sound element 27 may not be provided between the back chassis 35 and the liquid crystal display 100. In an alternative exemplary embodiment, the vibration plate 50 may also be omitted. In another alternative exemplary embodiment, the vibration plate 50 or the sound element 27 may be provided at the rear surface of the liquid crystal display 100, as shown in FIG. 1. In such an embodiment, the amp 80 may also transmit the sound signal to the sound element 27, and different sound signals may be transmitted to the receiver 150 and the sound element 27, respectively, by the amp 80.

FIG. 12 is a perspective view of an inside surface of an exemplary embodiment of the display panel assembly 70.

FIG. 12 shows lower surfaces of the receiver 150 and the display panel assembly 70 attached to an inside surface of the window 30.

The receiver 150 and the display panel assembly 70 are connected by the receiver wiring 150-1, and the receiver wiring 150-1 may receive the sound signal from the amp 80 in the display panel assembly 70.

In an alternative exemplary embodiment, the sound signal may be transmitted from an additional input terminal.

In an exemplary embodiment, as described above, the display device 100 may be the liquid crystal display including the backlight, but not being limited thereto. In an alternative exemplary embodiment, the display device 100 may be a self-emissive type display device without a backlight unit, e.g., an organic light emitting device.

Next, an exemplary embodiment of the sound element 27 having a film shape will be described with reference to FIG. 13 to FIG. 16.

Firstly, a cross-sectional view of the sound element 27 will be described with reference to FIG. 13.

Figure 13:
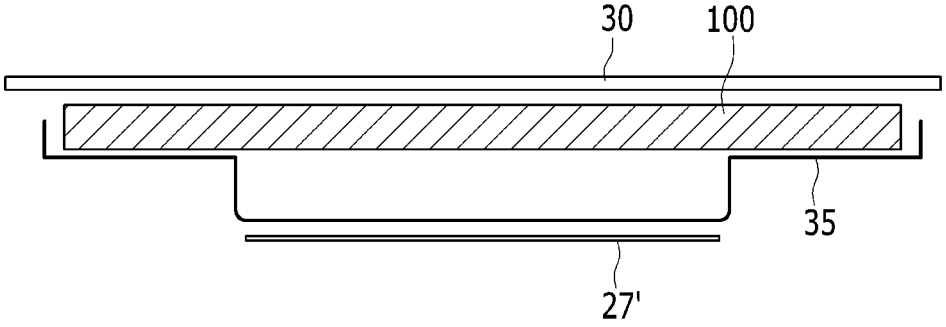
FIG. 13 is a cross-sectional view of another alternative exemplary embodiment of a display device unit according to the invention.

FIG. 13 is a cross-sectional view of another alternative exemplary embodiment of a display device unit according to the invention.

The display device shown in FIG. 13 is substantially the same as the display device shown in FIG. 2, except that the vibration plate 50 is omitted and a sound element 27' is in a film shape.

In an exemplary embodiment, as shown in FIG. 13, the sound element 27' is provided at the rear surface of the back chassis 35. In an alternative exemplary embodiment, the sound element 27' may be provided between the back chassis 35 and the liquid crystal display 100, that is, the rear surface of the liquid crystal display 100 (e.g., the rear surface of the bottom chassis 28).

As described above, in an exemplary embodiment, the display device 100 may be a self-emissive display device such as an organic light emitting device.

The window 30 is positioned at the front surface of the liquid crystal display 100, and may form an outer surface of a display side of an electronic device, e.g., a portable electronic device such as a portable phone.

The back chassis 35 protects the rear surface and the side surface of the liquid crystal display 100, and is combined with the window 30 to enclose the liquid crystal display.

In an alternative exemplary embodiment, at least one of the window 30 and the back chassis 35 may be omitted.

The sound element 27' of the film shape will be described in greater detail with reference to FIG. 14.

FIG. 14 is a cross-sectional view of an exemplary embodiment of the sound element of FIG. 13.

Referring to FIG. 14, an exemplary embodiment of the sound element 27' includes a vibration material layer 27-1, a pair of electrodes 27-2, and pads 27-5.

The vibration material layer 27-1 includes the piezoelectric material that provides a sound through vibration when the electric field is applied thereto. In an exemplary embodiment, the piezoelectric material may include PVDF or PZT. In such an embodiment, the PVDF may be used as the piezoelectric material, or PVDF and PZT may be mixed and provided in the film structure.

The pair of electrodes 27-2 are respectively provided at both side surfaces (e.g., the upper side surface and the lower side surface) of the vibration material layer 27-1. Each of the pair of electrode 27-2 may include the transparent conductor, such as ITO and IZO, the conductive polymer or the CNT. The electrode 27-2 may have a film shape that is formed throughout the entire upper and lower surfaces of the vibration material layer 27-1. In an exemplary embodiment, a pair of pads 27-5 are provided at a portion of the upper and lower surfaces of the vibration material layer 27-1, respectively, and the pair of pads 27-5 are respectively connected to the electrodes 27-2. The pads 27-5 may include a transparent conductor or an opaque metal. The sound signal amplified in the amp 80 is applied to the electrode 27-2 by the sound signal wire 80-1 through the pads 27-5, and the sound is generated by the vibration material layer 27-1 that is vibrated based on the sound signal.

Figure 15:
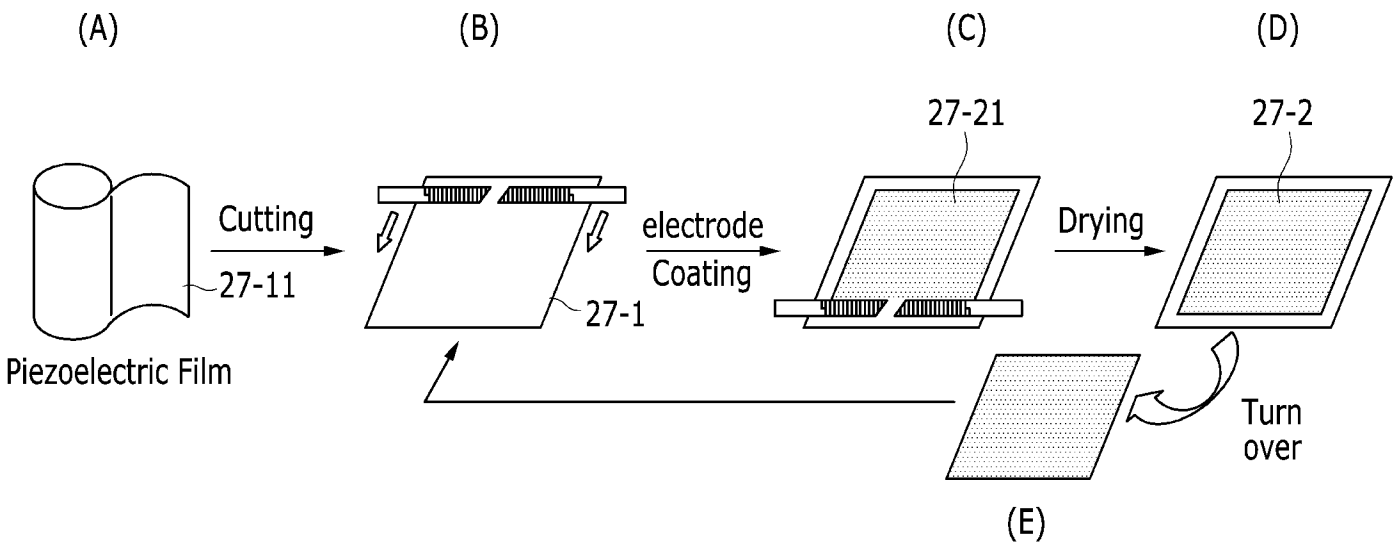
FIG. 15 and FIG. 16 are diagrams shown an exemplary embodiment of a manufacturing method of a sound element according to the invention.
Figure 16:
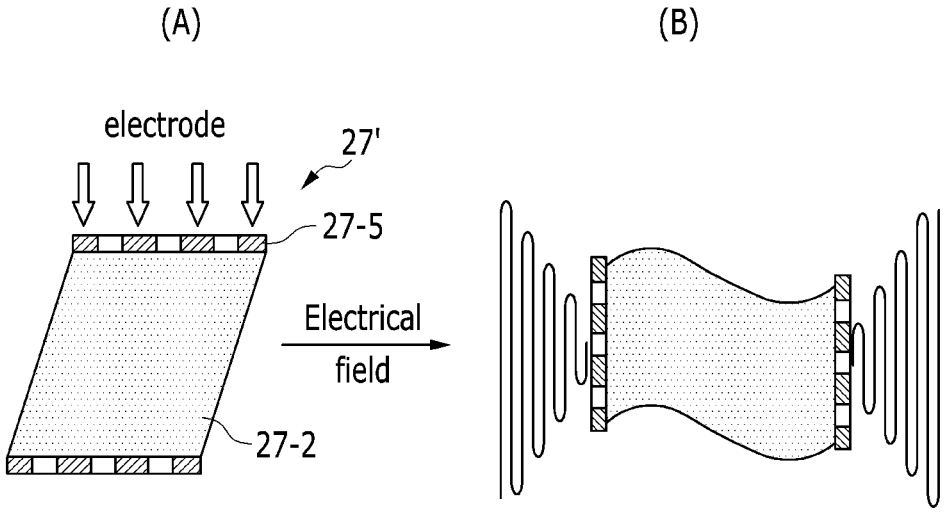

The sound element 27' of the film shape shown in FIG. 14 may be manufactured by an exemplary embodiment of a method shown in FIG. 15 and FIG. 16.

Next, an exemplary embodiment of a manufacturing method of a sound element according to the invention will be described with reference to FIG. 15 and FIG. 16.

FIG. 15 and FIG. 16 are views showing an exemplary embodiment of a manufacturing method of a sound element according to the invention.

FIG. 15 shows a method of providing the vibration material layer 27-1 and the pair of electrodes 27-2 in the sound element 27'.

As shown in (A) of FIG. 15, the vibration material layer 27-1 is provided by cutting a vibration material 27-11 (e.g., a PVDF film) of the film shape.

Next, as shown in (B) to (D) of FIG. 15, the conductive polymer such as poly(3,4-ethylenedioxythiophene) ("PEDOT") or CNT is coated on a surface of the vibration material layer 27-1 (referring to 27-21 in (C) of FIG. 15), and then an electrode 27-2 is formed through a drying process.

Next, as shown in (E) of FIG. 15, the electrode 27-2 is also provided on an opposing surface of the vibration material layer 27-1 through the processes shown in (B) to (D) of FIG. 15.

Next, as shown in (A) of FIG. 16, the pad 27-5 is provided on at least a portion of the vibration material layer 27-1 of the sound element 27'. The pad 27-5 is provided in a pair to transmit the sound signal to a pair of electrodes 27-2, and may be provided at both surfaces of the vibration material layer 27-1.

In an exemplary embodiment, as shown in (B) of FIG. 16, the vibration material layer 27-1 is vibrated by the application of the sound signal to the pair of electrodes 27-2 through the pad 27-5, thereby generating the sound.

In exemplary embodiments set forth herein, the sound element 27' of the film shape may be adhered to the rear surface of the display device 100 or the rear surface of the back chassis 35, thereby providing the sound based on the vibration. In an exemplary embodiment, the sound element 27' of the film shape may perform the function of the receiver 150 of a phone.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

[1. A display device unit comprising:

a display device;

a sound element disposed at a side surface or a rear surface of the display device;

a vibration plate disposed between the display device and the sound element; and a back chassis disposed at a rear surface of the display device, and comprising a fixing protrusion which protrudes toward the rear surface of the display device, wherein the sound element comprises:

a vibration material layer which generates a sound based on an electric field applied therein, and a pair of electrodes which generate the electric field in the vibration material layer, and wherein the fixing protrusion is formed integrally with the back chassis and of the same material as that of the back chassis, and wherein the sound element is disposed between the fixing protrusion and the vibration plate and the fixing protrusion overlaps a center of the sound element and contacts one of the electrodes of the sound element such that the fixing protrusion effectively prevents the sound element from being displaced by vibration.]

[2. The display device unit of claim 1, further comprising:

a first spacer disposed between the sound element and the vibration plate.]

[3. The display device unit of claim 2, further comprising:

a second spacer attached between the sound element and the back chassis.]

[4. The display device unit of claim 2, wherein the sound element is provided as a pair.]

[5. The display device unit of claim 1, further comprising:

a window disposed on a front surface of the display device.]

[6. The display device unit of claim 1, further comprising:

a receiver disposed at the side surface of the display device and an inner surface of the window, wherein the receiver comprises the sound element and generates the sound.]

[7. The display device unit of claim 6, wherein an opening exposing the receiver is not defined in the window.]

[8. The display device unit of claim 1, wherein the vibration material layer of the sound element generates a vibration of a frequency outside an audible frequency, and a haptic function the display device unit uses a change of the frequency of the vibration of the vibration material layer by a touch of a user.]

*9. A display device unit comprising:*

*a display device;*

*a back chassis disposed at a rear surface of the display device and comprising a first vibration space and a protrusion protruding from the first vibration space toward an outside of the display device;*

*a first sound element at least a portion of which is disposed inside of the first vibration space; and*

*a first adhesive adhering the rear surface of the display device and the back chassis,*

*wherein a rear surface of the back chassis includes a protrusion structure formed by the protrusion,*

*the first adhesive is disposed between the first sound element and edges of the display device in a plan view,*

*the first adhesive overlaps a display panel of the display device in the plan view, and*

*a width of the protrusion is smaller than a gap between the protrusion and the first adhesive in the plan view.*

*10. The display device unit of claim 9, wherein*

*the back chassis further comprises a flat surface, which is parallel to the rear surface of the display device, and*

*the first adhesive is disposed between the rear surface of the display device and the flat surface of the back chassis.*

*11. The display device unit of claim 10, wherein*

*the first adhesive is disposed along a boundary of the first vibration space.*

*12. The display device unit of claim 10, wherein:*

*the first adhesive comprises at least two first adhesives that are disposed respectively near a boundary of the first vibration space.*

*13. The display device unit of claim 9, wherein:*

*the first adhesive and the back chassis define the first vibration space where the first sound element vibrates.*

*14. The display device unit of claim 9, further comprising:*

*a window disposed on a front surface of the display device.*

*15. The display device unit of claim 9, wherein*

*the first sound element comprises:*

*a vibration material layer which generates a sound based on an electric field applied therein, and*

*a pair of electrodes which generate the electric field in the vibration material layer.*

*16. The display device unit of claim 9, further comprising:*

*a second sound element disposed inside of the back chassis, and*

*wherein the back chassis further comprises a second vibration space, and*

*the second sound element is disposed inside of the second vibration space.*

*17. The display device unit of claim 16, further comprising:*

*a second adhesive adhering the rear surface of the display device and the back chassis,*

*wherein the second adhesive is disposed near the second vibration space.*

*18. The display device unit of claim 17, wherein*

*the second adhesive is disposed along a boundary of the second vibration space.*

*19. The display device unit of claim 17, wherein:*

*the second adhesive comprises at least two second adhesives that are disposed respectively near a boundary of the second vibration space.*

*20. The display device unit of claim 16, wherein*

*the first sound element is disposed in a left half of the back chassis, and*

*the second sound element is disposed in a right half of the back chassis.*

*21. The display device unit of claim 16, further comprising:*

*another adhesive disposed between the back chassis and the first or the second sound element to attach the first or the second sound element inside of the back chassis.*

*22. The display device unit of claim 16, wherein*

*the first and the second sound elements comprise:*

*a vibration material layer which generates a sound based on an electric field applied therein, and*

*a pair of electrodes which generate the electric field in the vibration material layer.*

*23. The display device unit of claim 17, wherein:*

*the second adhesive and the back chassis define the second vibration space where the second sound element vibrates.*

*24. The display device unit of claim 16, wherein*

*the first and second vibration spaces are formed integrally with the back chassis and of the same material as that of the back chassis.*

*25. The display device unit of claim 16, further comprising:*

*a third adhesive disposed between the back chassis and the first sound element to attach the first sound element inside of the back chassis.*

*26. The display device unit of claim 25, further comprising:*

*a fourth adhesive disposed between the back chassis and the second sound element to attach the second sound element inside of the back chassis.*

*27. The display device unit of claim 16, further comprising:*

*a window disposed on a front surface of the display device.*

*28. The display device unit of claim 22, wherein*

*the vibration material layer of the sound element generates a vibration of a frequency outside an audible frequency, and*

*a haptic function the display device unit uses a change of the frequency of the vibration of the vibration material layer by a touch of a user.*

* * * * *